United States Patent
Gobburu et al.

(10) Patent No.: US 9,356,658 B2
(45) Date of Patent: May 31, 2016

(54) METHOD AND APPARATUS FOR CONTROLLING AND POWERING AN ELECTRONIC ACCESSORY FROM A MOBILE DIGITAL DEVICE

(71) Applicants: Venkata T. Gobburu, San Jose, CA (US); Nagesh Challa, Saratoga, CA (US)

(72) Inventors: Venkata T. Gobburu, San Jose, CA (US); Nagesh Challa, Saratoga, CA (US)

(73) Assignee: INKOTI LLC, Saratoga, CA (US)

( * ) Notice: Subject to any disclaimer, the term of this patent is extended or adjusted under 35 U.S.C. 154(b) by 785 days.

(21) Appl. No.: 13/763,334

(22) Filed: Feb. 8, 2013

(65) Prior Publication Data

US 2013/0207481 A1   Aug. 15, 2013

Related U.S. Application Data

(60) Provisional application No. 61/597,307, filed on Feb. 10, 2012.

(51) Int. Cl.
*H02B 1/00*   (2006.01)
*H04R 3/00*   (2006.01)
(Continued)

(52) U.S. Cl.
CPC ............ *H04B 5/0037* (2013.01); *H04B 5/0006* (2013.01); *H04B 5/0031* (2013.01); *H04B 5/06* (2013.01); *H04R 3/00* (2013.01); *H04R 3/12* (2013.01); *H04R 5/04* (2013.01); *H04R 2420/03* (2013.01)

(58) Field of Classification Search
CPC ............ H04R 3/00; H04R 3/005; H04R 3/04; H04R 1/04; H04R 1/08; H04R 3/12; H04R 5/04; H04R 2420/03

USPC ............ 381/1, 28, 80, 81, 91, 92, 120, 122, 381/111–117
See application file for complete search history.

(56) References Cited

U.S. PATENT DOCUMENTS

| | | | | |
|---|---|---|---|---|
| 4,453,264 A | * | 6/1984 | Hochstein | ............... H03F 1/305 381/110 |
| 7,343,015 B2 | * | 3/2008 | Lam | ......................... H03F 3/68 381/14 |

(Continued)

OTHER PUBLICATIONS

Fitbit Inc. Fitbit Products [online], 2011 [retrieved on May 16, 2013]. Retrieved from the Internet: <URL: http://web.archive.org/web/20120209222432/http://fitbit.com/product>. 1 page.

(Continued)

*Primary Examiner* — Xu Mei
(74) *Attorney, Agent, or Firm* — David H. Carroll

(57) ABSTRACT

Various energy harvesting and control techniques are used to power and control electronic accessories from the audio output channels and microphone input channel of mobile digital devices while preserving audio input and output functionality. One technique uses one of the stereophonic audio channels to generate power, and the other in conjunction with the microphone jack to enable bi-directional communications while preserving audio input and output. Another technique allows a low powered electronic accessory with bi-directional communications to be supported while simultaneously supporting audio input & stereo output. These techniques facilitate the ability to play music, narration and instruction and to receive oral responses and instruction with no perceived loss or gaps, even while using the audio jack of a mobile digital device to harvest energy and bi-directional communication.

9 Claims, 7 Drawing Sheets

(51) Int. Cl.
H04B 5/00 (2006.01)
H04B 5/06 (2006.01)
H04R 3/12 (2006.01)
H04R 5/04 (2006.01)

(56) References Cited

U.S. PATENT DOCUMENTS

| | | | | |
|---|---|---|---|---|
| 8,019,096 | B2* | 9/2011 | Sander | H04R 1/1041 381/122 |
| 8,699,963 | B2* | 4/2014 | Chen | 381/1 |
| 8,931,699 | B1* | 1/2015 | Wade | G06K 7/084 235/435 |
| 9,204,220 | B2* | 12/2015 | Chang | H04R 5/04 |
| 2002/0131611 | A1* | 9/2002 | Hoover | H04R 5/04 381/123 |
| 2005/0232448 | A1* | 10/2005 | Kung | H04R 5/04 381/123 |
| 2008/0304596 | A1* | 12/2008 | Tan | H04N 21/4344 375/321 |

OTHER PUBLICATIONS

Gobburu, Venkata et al. Method and Apparatus for Controlling and Powering an Electronic Accessory from a Mobile Digital Device, U.S. Appl. No. 61/597,307, Feb. 10, 2012. 36 pages.

IHealth Lab Inc. iHealth iPhone, iPad BP3 Blood Pressure Monitor [online], 2011 [retrieved on May 8, 2013]. Retrieved from the Internet: <URL: http://web.archive.org/web/20111228122915/http://www.ihealth99.com/ihealth/bp3.html>. 2 pages.

Ion Audio, LLC. Piano Apprentice—Piano Learning System for iPad, iPod and iPhone [online], 2011 [retrieved on May 8, 2013]. Retrieved from the Internet: <URL: http://web.archive.org/web/20120113042127/http://www.ionaudio.com/products/details/piano-apprentice>. 2 pages.

Jawbone. Up by Jawbone I Make Healthy Living Fun & Social [online], 2012 [retrieved on May 8, 2013]. Retrieved from the Internet: <URL: http://web.archive.org/web/20120205225411/http://jawbone.com/up/?>. 3 pages.

Kuo, Ye-Sheng et al. Hijacking Power and Bandwidth from the Mobile Phone's Audio Interface, ACM DEV'10: Proceedings of the First ACM Symposium on Computing for Development, Dec. 2010. 10 pages.

Li, Jing. NASA Ames Scientist Develops Cell Phone Chemical Sensor [online], Oct. 30, 2009 [retrieved on May 8, 2013]. Retrieved from the Internet: <URL: http://web.archive.org/web/20120209061156/http://www.nasa.gov/centers/ames/news/features/2009/cell_phone_sensors.html>. 2 pages.

Wikipedia. Nike+iPod [online], Jan. 16, 2012 [retrieved on May 8, 2013]. Retrieved from the Internet: <URL: http://web.archive.org/web/20120119175549/http://en.wikipedia.org/wiki/Nike%2BiPod>. 4 pages.

Withings. Withings—The Blood Pressure Monitor [online], 2012 [retrieved on May 8, 2013]. Retrieved from the Internet: <URL: http://web.archive.org/web/2012020612442/http://www.withings.com/en/bloodpressuremonitor>. 3 pages.

* cited by examiner

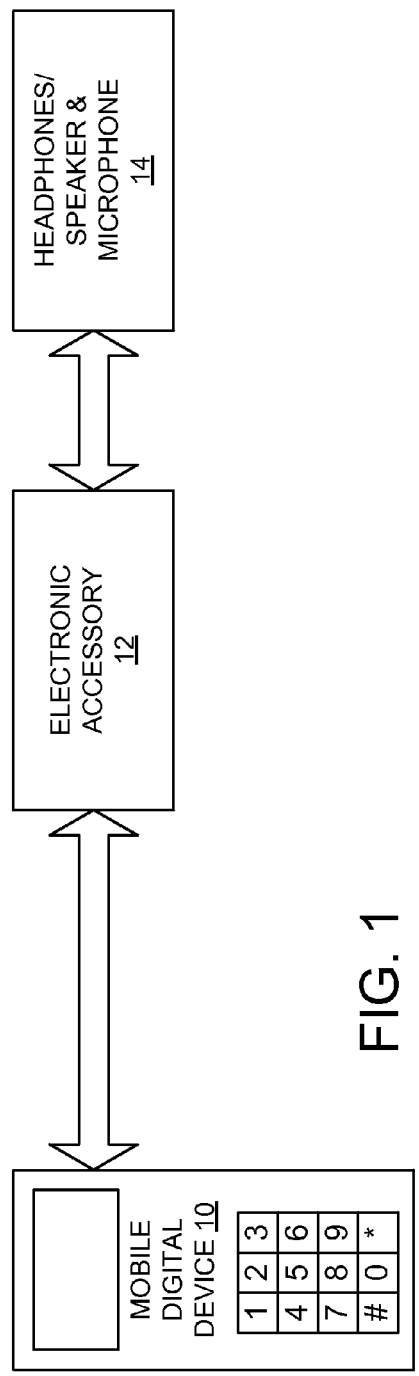
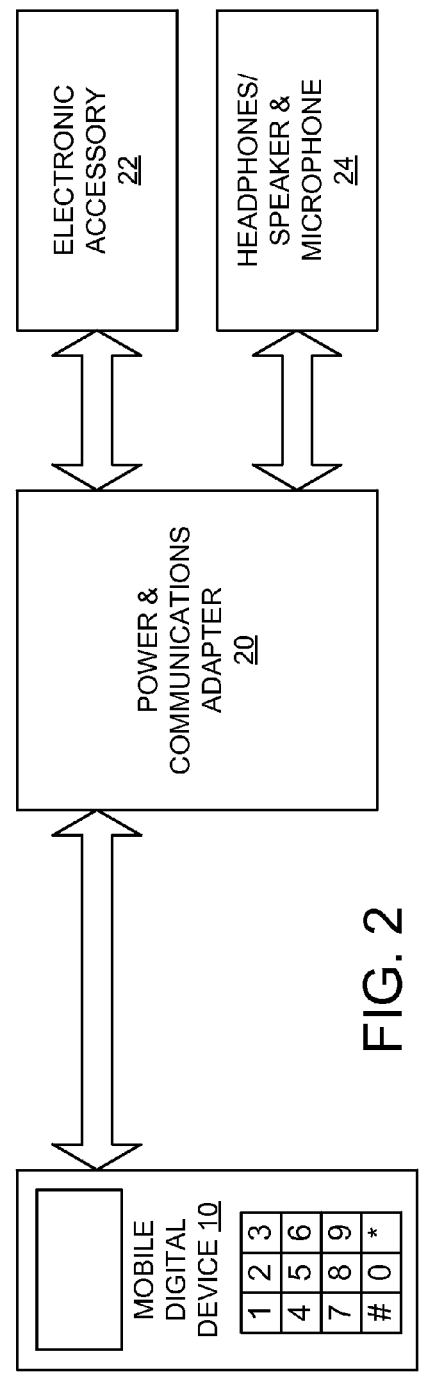

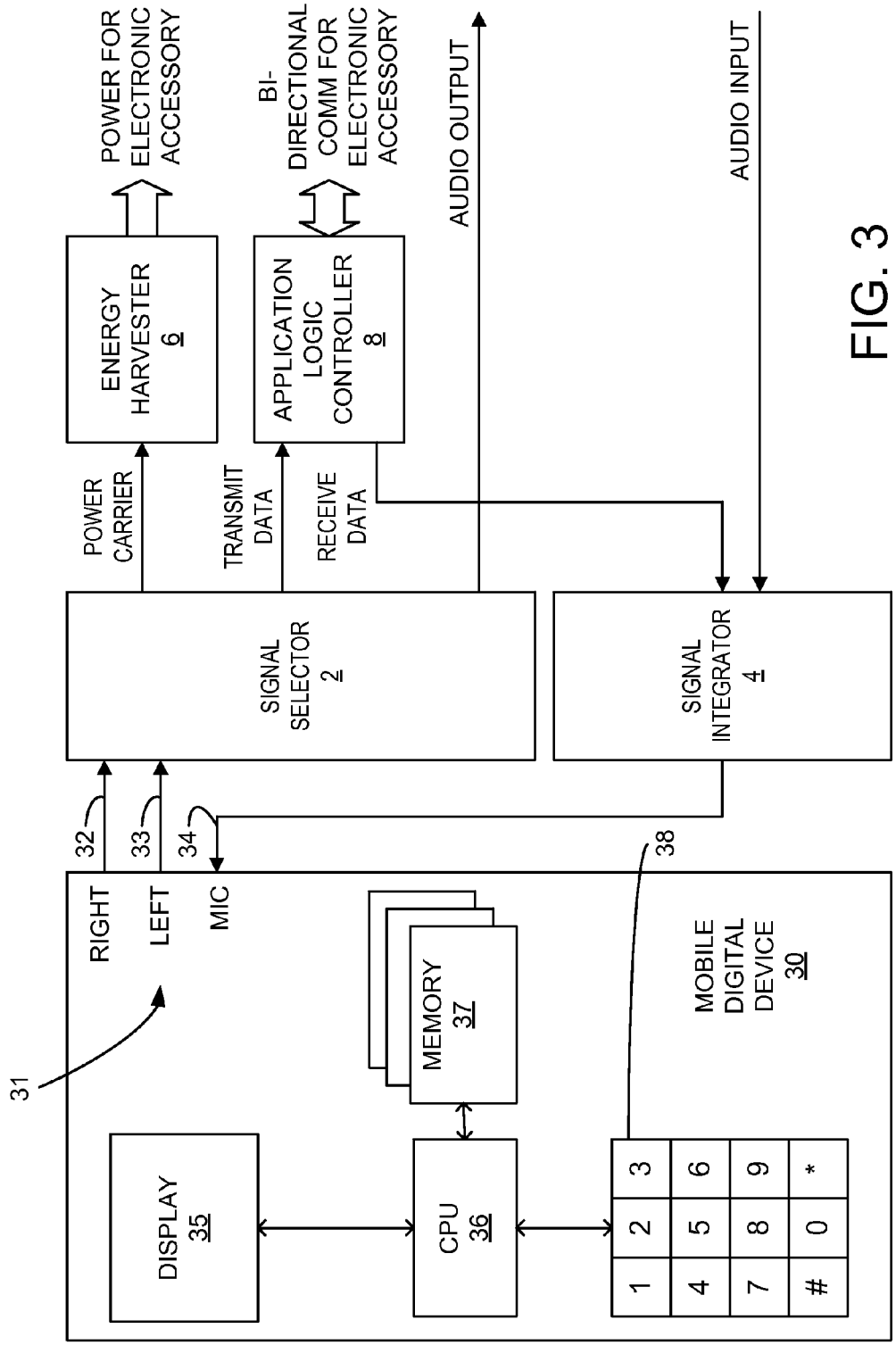

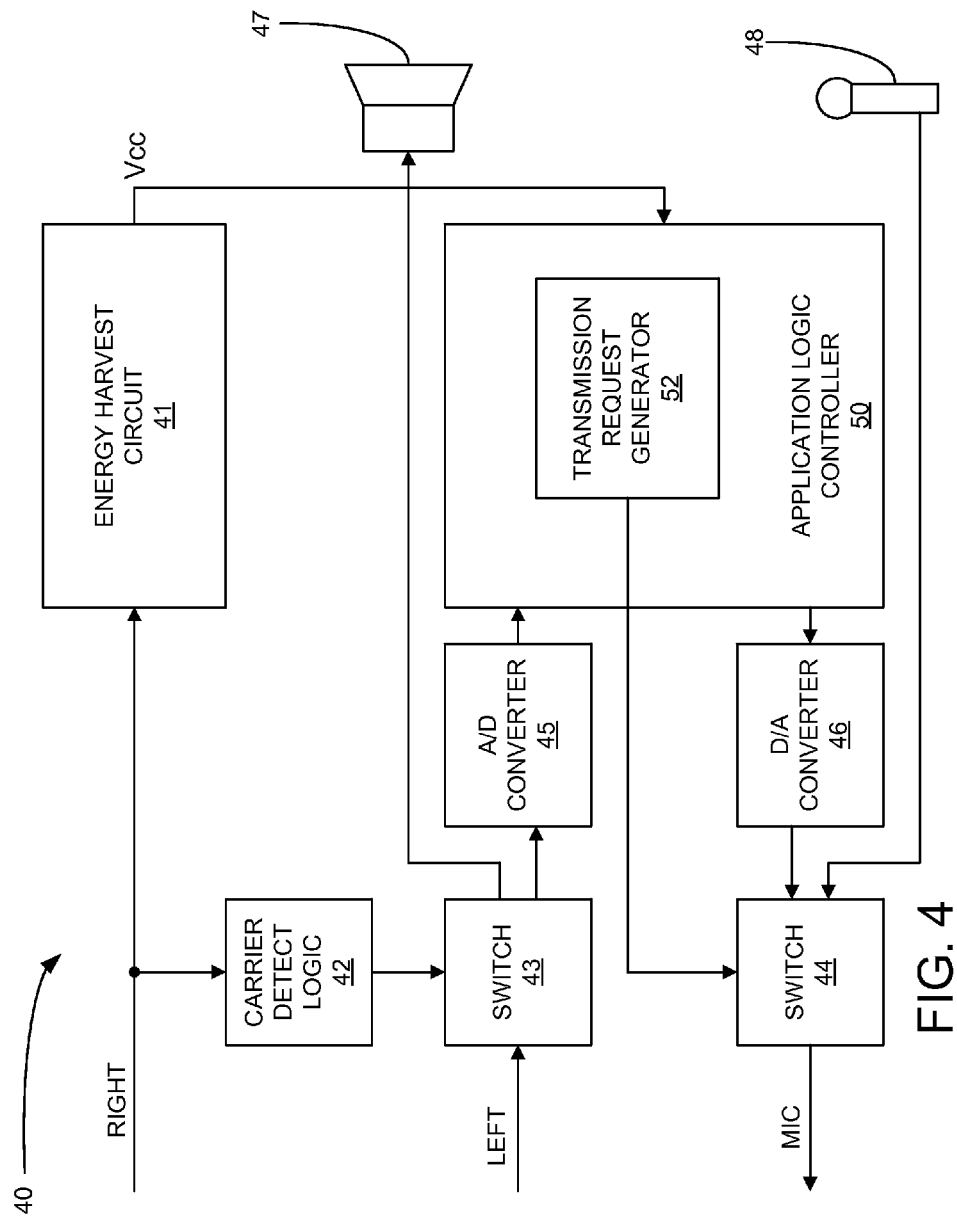

METHOD AND APPARATUS FOR CONTROLLING AND POWERING AN ELECTRONIC ACCESSORY FROM A MOBILE DIGITAL DEVICE

CROSS-REFERENCE TO RELATED APPLICATIONS

This application claims the benefit of U.S. Provisional Patent Application Ser. No. 61/597,307 filed Feb. 10, 2012, which hereby is incorporated herein in its entirety by reference thereto.

BACKGROUND OF THE INVENTION

1. Field of the Invention

This invention relates to mobile digital devices and electronic accessories therefor, and more particularly to controlling and powering electronic accessories from mobile digital devices.

2. Description of the Related Art

Mobile phones have become ubiquitous. Part of the explanation for the explosive growth is the fact that there has been a tremendous upsurge in the availability of applications. Gaming and social networking applications abound side by side of serious applications to enhance productivity, view documents and so on. An equally interesting trend is the surge in mobile phone accessories. For a long time accessories were mostly in extending the audio capabilities. Headphones of various kinds and noise cancelling headphones became mainstream products. Health monitoring devices such as blood pressure cuffs and credit card readers are other examples. Bluetooth brought about a proliferation of tiny, wireless audio accessories. Email focused keyboard accessories found their way to the market to overcome the tightly spaced, cramped keypads on the mobile phone. As mobile phones became more computationally more powerful and sported high quality displays, the accessories have also evolved. A number of accessories and applications have been developed for the iOS platform that covers the iPhone, iTouch and iPad device types.

Health and fitness has become a ripe area as evidenced by the following examples.

The Nike+iPod Sports Kit is a device which measures and records the distance and pace of a walk or run; Nike+ iPod, Wikipedia article http://en.wikipedia.org/wiki/Nike%2BiPod. It has a small transmitter device attached to or embedded in a shoe, which communicates with either the Nike+ Sportband, a receiver plugged into an iPod Nano, or directly with a 2nd, 3rd, or 4th Generation iPod Touch, iPhone 3GS or iPhone 4 or a Nike+Sportwatch. If using the iPod or the iPhone 3GS, iTunes software can be used to view the walk or run history. The kit includes two pieces: a piezoelectric sensor with a Nordic Semiconductor nRF2402 transmitter that is mounted under the inner sole of the shoe and a receiver that connects to the iPod. They communicate using a 2.4 GHz wireless radio. As the sensor battery cannot be replaced, a new one must be purchased every time the battery runs out.

You can check your blood pressure using an iOS device such as the iPhone, iTouch or iPad. Two market available devices are the iHealth BP3 (iHealth BP3 Blood Pressure Monitor, http://www.ihealth99.com/ihealth/bp3.html) and the Withings Blood Pressure Monitor (Withings Blood Pressure Monitor, http://www.withings.com/en/bloodpressure-monitor). Operation is extremely easy and requires download of an app onto the iOS device, put on a blood pressure cuff, tap the touchscreen to start the measurement, and within seconds you have a blood pressure reading that you can track every day.

Other examples in the health and fitness area are the FitBit (Fitbit, http://www.fitbit.com/product) and the Jawbone Up (Jawbone Up, http://jawbone.com/up).

Examples in the entertainment section include remote controllers for stereo equipment.

Musical instruments are another category. The Piano Apprentice product is a piano teaching tool for iPad, iPod and iPhone; see Piano Apprentice, http://www.ionaudio.com/products/details/piano-apprentice. It is a lightweight, portable 25-note keyboard with built-in stereo speakers that deliver piano sound in response to touch. It is a simple connection to the iPad, iPod or iPhone, download the free app, and start playing piano.

Another example of an accessory is the work of Jiang Li, a NASA scientist who created a 30-pin accessory that allows an iPhone or iPod touch to be used as a chemical sensor; see "NASA Ames Scientist Develops Cell Phone Chemical Sensor", 10.30.09, http://www.nasa.gov/centers/ames/news/features/2009/cell_phone_sensors.html. The postage stamp-sized device packs 16 nanosensors that allow for detection and identification of low concentrations airborne ammonia, chlorine gas, and methane. Connected to an iPhone or iPod touch's Dock port and used with a special app, the system can send detection data to another device over a cellular or Wi-Fi network.

Many of the available mobile phone accessories are battery operated. Communication between the mobile phone and the accessory takes place over standard interfaces such as the wireless Bluetooth or over wired connections such as USB. It is not an ideal because it requires periodic replacement of the battery and in some cases user aggravation because of untimely replacements.

The IPHONE® mobile digital device available from Apple Computer Inc. of Cupertino, Calif., USA, allows limited access to the mobile phone's internal battery and communications through a proprietary connector. Accessories designed specifically with this family of mobile digital devices are designed to work with this proprietary connector. This controlled proprietary interface allows a limited amount of power to be drawn from the mobile digital device and also obtains bi-directional communication capabilities. The two drawbacks of this approach are that accessories have to be purpose built for these proprietary interfaces and often require a royalty payment.

Power and communications for accessories has been achieved using the headset audio port of the mobile phone. An interface of this type using a 3.5mm, 4 connector audio port is disclosed in Ye-Sheng Kuo et al., "Hijacking Power and Bandwidth from the Mobile Phone's Audio Interface," ACM DEV'10: Proceedings of the First ACM Symposium on Computing for Development, December 2010. Kuo et al. use the right audio channel to provide a signal for power harvesting purposes, and the left audio channel and the microphone channel for bi-directional communications.

BRIEF SUMMARY OF THE INVENTION

While the approach taken by Kuo et al. may allow a mobile phone to interface with a range of external peripherals, it precludes the use of the headset audio port for audio input and output. This preclusion is disadvantageous for the use of electronic accessories in applications wherein audio input and/or output are needed.

One embodiment of the present invention is an apparatus for powering and controlling an electronic accessory from a mobile digital device, comprising a right audio channel input terminal; a left audio channel input terminal; a microphone output terminal; a signal selector coupled to the right audio channel input terminal and to the left audio channel input terminal, and having a power output for providing a power carrier from one or both of the right and left audio channel input terminals, a transmit data output for providing transmit data from one or both of the right and left audio channel input terminals, and an audio output for providing an audio signal from one or both of the right and left audio channel input terminals; a signal integrator coupled to the microphone output terminal for outputting on the microphone output terminal an integrated signal comprising an audio signal from an audio input and receive data from a receive data input; an application logic controller for controlling interactions between the mobile digital device and the electronic accessory, the application logic controller having an input coupled to the transmit data output of the signal selector, and an output coupled to the receive data input of the signal integrator; and an energy harvester coupled to the power output of the signal selector for generating power for the signal selector, the signal integrator, the application logic controller, and the electronic accessory from the power carrier.

BRIEF DESCRIPTION OF THE SEVERAL VIEWS OF THE DRAWINGS

FIG. 1 is a schematic block diagram of an electronic accessory being operated from a mobile digital device.

FIG. 2 is a schematic block diagram of an electronic accessory being operated from a mobile digital device through a power and communications adapter.

FIG. 3 is a schematic block diagram of a general implementation for powering and communicating with an electronic accessory from an audio connector of a mobile digital device.

FIG. 4 is a block schematic diagram of an implementation for providing power and communications for an electronic accessory from an audio connector of a mobile digital device, in which audio output is needed on only one of the audio output channels.

DETAILED DESCRIPTION OF THE INVENTION, INCLUDING THE BEST MODE

Figure 5:
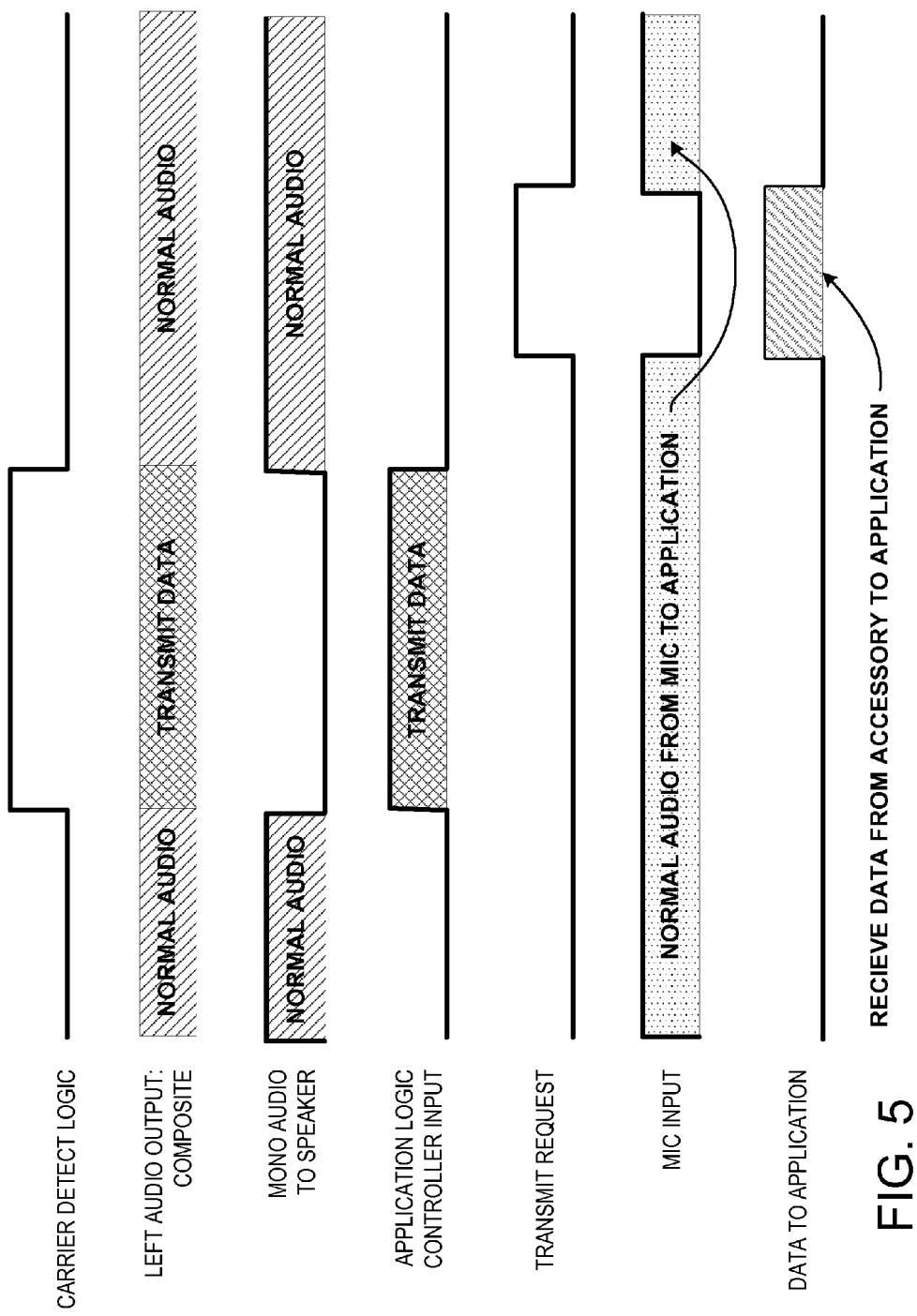
FIG. 5 is a multi-part graph shows illustrative signals for the implementation shown in FIG. 4.

Novel energy harvesting and control techniques are described herein to power and control electronic accessories for mobile digital devices while preserving audio input and output functions.

One of the techniques uses one of the stereophonic audio channels to generate power, and the other in conjunction with the microphone jack to enable bi-directional communications while preserving audio input and output. This technique is particularly suitable where true stereophonic sound through the audio jack is not required. Another one of the techniques allows a low powered electronic accessory with bi-directional communications to be supported while simultaneously supporting audio input & stereo output. These techniques facilitate the ability to play music, narration and instruction and to receive oral responses and instruction with no perceived loss or gaps, even while using the audio jack of a mobile device to harvest energy and bi-directional communication.

The term "mobile digital devices" refers to electronic devices that can be easily carried on the person, and include mobile communication devices such as mobile phones, smartphones, multimedia convergence devices such as the IPHONE® mobile digital device available from Apple Inc. of Cupertino, Calif., USA, various mobile digital devices that run the Android operating system or the Windows mobile operating system, tablet computers with mobile browsers, and communications enabled personal digital assistants ("FDA"), mobile entertainment devices such as gaming devices and audio and video players and other devices suitable for being carried on the person such as fobs and USB flash drives. These devices typically have processors or microcontrollers and internal and/or removable memory and operate in accordance with computer program components stored in memory. Mobile digital devices are suitable for many uses, including communications, entertainment, security, commerce, guidance, data storage and transfer, and so forth, and may be dedicated for a particular use or may be suitable for a combination of uses. The techniques described herein enable the large and growing population of mobile digital devices, and in particular mobile entertainment devices and powerful convergence devices, to enable electronic accessories to be operated and communicated with over the ubiquitous audio jack, without sacrificing the ability to simultaneously listen to audio content such as music and record audio content.

A typical audio connector used on the mobile digital devices uses four terminals. Two of the terminals, typically denoted as Left Audio Out and Right Audio Out, typically are used to deliver audio content from the mobile digital device to audio headphones or speakers. A third terminal, typically designated as MIC, typically is used to convey audio signals from an external microphone to the mobile digital device. The fourth terminal, typically referred to as Ground, enables the mobile digital device to establish a common reference level with the external circuitry.

The ability to operate electronic accessories through the audio connector involves two basic requirements, the first to extract or harvest sufficient energy for the electronic accessory, and the second to establish bi-directional communications between the mobile digital device and the electronic accessory.

FIG. 1 is a schematic block diagram of an electronic accessory 12 being operated from a mobile digital device 10. The electronic accessory 12 not only is powered by and is in bi-directional communication with the mobile digital device 10, but also supports the use of speakers, headphones and microphones 14. The speakers and microphone 14 may be external to or built into the electronic accessory 12. The electronic accessory 12 may be provided with any type of audio connector for external speakers, headphones and microphones 14.

FIG. 2 is a schematic block diagram of an electronic accessory 22 being operated from a mobile digital device 10 through a power and communications adapter 20. The electronic accessory 22 is powered by and is in bi-directional communication with the mobile digital device 10. The power and communications adapter 22 also supports the use of speakers, headphones and microphones 24. The speakers and microphone 24 may be external to or built into the power and communications adapter 20. The power and communications adapter 20 may be provided with any type of audio connector for external speakers, headphones and microphones 24.

FIG. 3 is a schematic block diagram of a general implementation for powering and communicating with an electronic accessory from an audio connector 31 of a mobile digital device 30, while preserving at least some audio output and audio input functionality for the mobile digital device 30. An application resident in memory 37 executes on CPU 36 of the mobile digital device 30 to transmit and receive suitable signals on the audio connector 31 for providing power to and communications with the electronic accessory while preserving the capability for audio input and output. The right and left audio output channels 32 and 33 may be used singly or in combination to power the electronic accessory, to communicate with the electronic accessory, and to deliver audio output. The microphone input may be used to receive communications from the electronic accessory and to receive audio input. Depending on the type of device, the mobile digital device 30 may also include a display 35 and/or a keypad 38.

Each of the left and right audio channels 32 and 33 may carry an audio signal, a power carrier, a transmit data signal, or any combination of the foregoing. As used herein, the term "power carrier" refers to a signal that is designed to transfer power to an electronic accessory. As used herein, the term "transmit data" refers to data to the electronic device or a signal containing such data. The power carrier may additionally serve as a transmit data signal if modulated in accordance with the transmit data.

A signal selector 2 selects an audio signal or signals from one or both of the right and left audio input channel terminals and provides it as a monaural or stereo audio output.

The signal selector 2 also selects transmit data ("TD") from one or both of the right and left audio input channel terminals and provides the transmit data to application logic controller 8. The application logic controller 8 in turn provides data output to an electronic accessory in the appropriate form. The application logic controller 8 may include a microcontroller with supporting memory and circuit logic to perform its intended task.

The signal selector 2 also selects the power carrier ("PC") and provides it to an energy harvester 6 for generating power for the signal selector 2, a signal integrator 4, the application logic controller 8, and the electronic accessory.

As used herein, the term "receive data" refers to data from the electronic accessory or a signal containing such data. The receive data is received from the electronic accessory by the application logic controller 8, which in turn provides it to the signal integrator 4. The signal integrator 4 also receives audio input, and integrates the two signals so that they may be provided to the mobile digital device 30 over the microphone channel 34.

The signal selector 2 and the signal integrator 4 may be implemented in different ways to meet different requirements of different types of electronic accessories.

Some types of electronic accessories require continuous power during an operating cycle of several seconds, several minutes, or even longer, but may need to communicate only intermittently during the operating cycle. Other types of electronic accessories require to be powered only for a few seconds or less for each operating cycle, but need to communicate while powered up. In some instances monaural audio is sufficient when the electronic accessory is in use, while in other instances stereophonic audio is desired or required.

FIG. 4 is a block schematic diagram of an implementation 40 for providing power and communications for an electronic accessory from an audio connector of a mobile digital device, in which audio output is needed on only one of the audio output channels. The implementation 40 is useful in situations wherein the electronic accessory needs to be powered up continuously during operating cycles of several seconds, several tens of seconds, or even longer, even though it may need to communicate only intermittently during the operating cycles. However, the implementation 40 may also be used for operating cycles of a few seconds or less during which communication may be needed. In the illustrative implementation 40, the right audio channel carries the power carrier from the mobile digital device for use by energy harvest circuit 41 to provide power to the implementation 40 as well as to the electronic accessory, while the left audio output channel carries the audio output and the transmit data from the mobile digital device. The application stored in the memory 37 and executed on the CPU 36 of the mobile digital device 30 (FIG. 3) has full a priori knowledge about the timing, data communications, and power requirements of the electronic accessory, so that when needed it can indicate to the accessory either imminent or ongoing transmission of data. The power carrier on the right audio channel may be synchronized to indicate whether there is need to transmit any digital information to the electronic accessory. Illustratively, the absence of the power carrier may indicate need to transmit digital information to the electronic accessory. The implementation 40 therefore has a carrier detect logic ("CDL") circuit 42 that functions as a detector for the power carrier. The carrier detect logic circuit 42 may be implemented in any desired way, either as logic gates or in code running on the microcontroller or processor in the application logic controller 50.

The output of the power carrier detect logic 42 is a binary control signal that indicates either the presence or absence of the power carrier, and is used to control a switch 43. Switch 43 routes the signal on the left audio output channel to application logic controller 50 through an analog-to-digital converter 45 for sending digital information to the electronic accessory when the binary control signal is active (illustratively indicated by an absence of the power carrier), and to a speaker or audio connector 47 for supplying monaural audio to the user when the binary control signal from the carrier detect logic 42 is inactive (illustratively indicated by the presence of the power carrier). The energy harvest circuit 41 is provided with sufficient power storage to power the electronic accessory for short periods of time while the power carrier signal is absent. Although the time period varies depending on the application, a period of three seconds is an example of a suitable time period. Restricting the transmission of data from the mobile digital device to small periods of time in comparison to the storage capacity of the energy harvest circuit 41 enables information exchange from the mobile digital device to the electronic accessory to be done without gaps. Moreover, the duration of the transmission period may be established to avoid the presence of perceivable gaps in the normal audio content to the listener.

Optionally the monaural audio may be delivered to two speakers. Furthermore the monaural audio may be further enhanced by a signal conditioning circuit to modify the listener experience; for example, simulated stereo wherein frequencies of the audio signal are selectively delivered to the two speakers, and enhanced voice signals to accommodate hearing impaired people.

The application logic controller 50 has full knowledge of any required digital data transmission to the mobile digital device. A transmission request generator 52 under control of the application logic controller 50 generates a binary control signal referred to as ALC Transmit Request, which is provided to switch 44. When active, the ALC Transmit Request causes the switch 44 to route the receive data signal from the application logic controller 50 through a digital-to-analog converter 46 to the audio input channel MIC. When inactive, the ALC Transmit Request causes the switch 44 to route the output of the microphone to the audio input channel MIC. This allows the ALC receive data to be available to the mobile digital device when required.

FIG. 5 is a multi-part graph which shows illustrative signals for the left audio output channel, the audio input channel, the various binary controls, and the normal audio control. When normal audio is present on the left audio output channel, the power carrier is present so that the Carrier Detect Logic signal is low and normal monaural audio is provided to the speaker or audio output connector. When transmit data is present on the left audio output channel, the power carrier is absent so that the Carrier Detect Logic signal goes high and the transmit data is applied to the input of the Application Logic Controller 50. When a Transmit Request is generated, the microphone input is interrupted and receive data is provided to the application.

While the embodiment of FIG. 4 and FIG. 5 use an interruption in the power carrier on the right audio output channel to indicate the presence of transmit data on the left audio output channel and to cause the carrier detect logic signal to go active (high), the embodiment of FIG. 4 may be varied by designing the carrier detect logic 42 to output an active (high) signal when the power carrier is present and to output an inactive (low) signal when the power carrier is absent. In this variation, the electronic accessory remains powered over an operating cycle which may include frequent communications as needed. While the operating cycle may be as long as desired, it may be of a limited duration to avoid the presence of perceivable gaps in the normal audio content to the listener.

Figure 6:
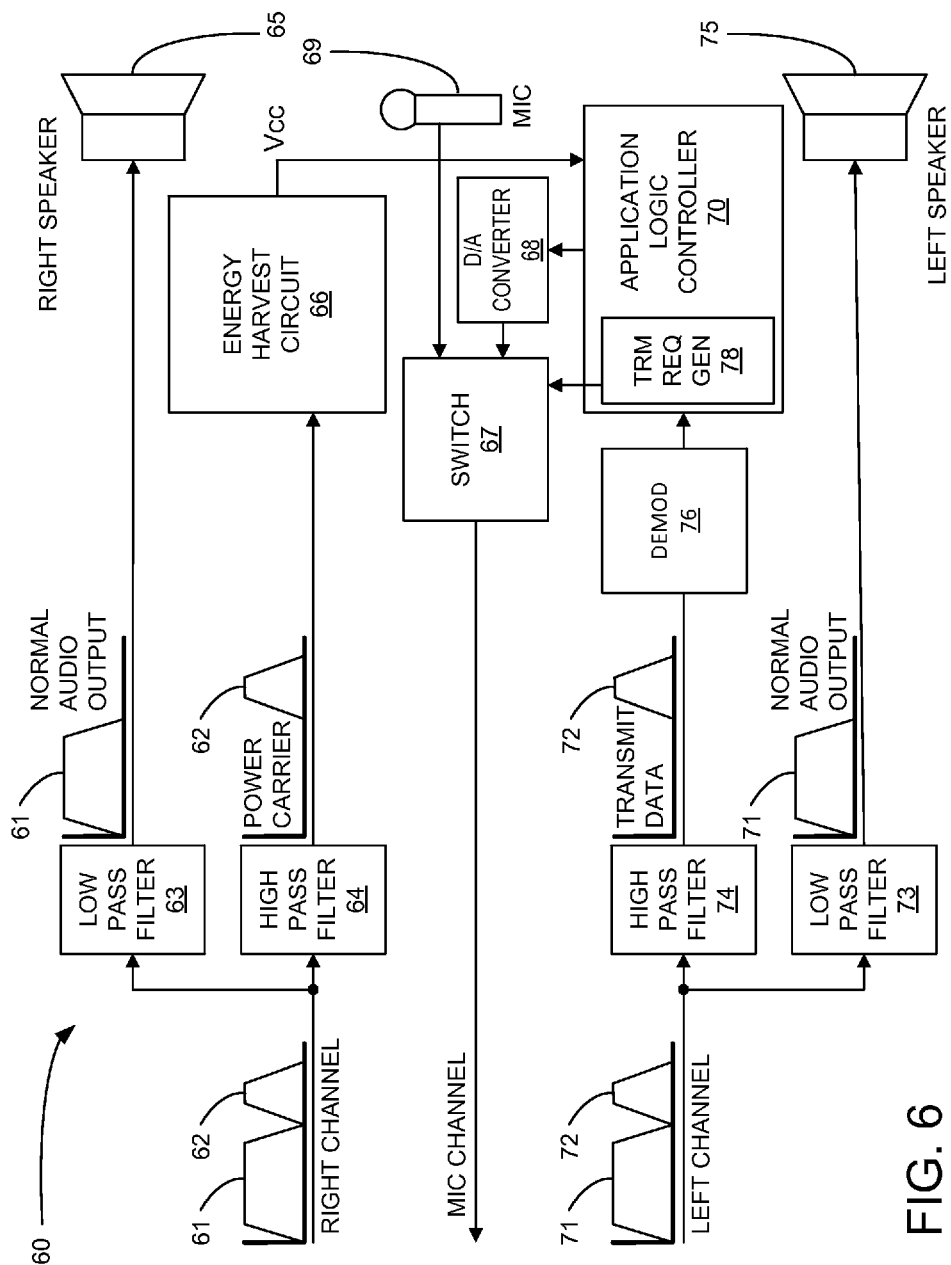
FIG. 6 is a block schematic diagram of an implementation for providing power and communications for an electronic accessory from an audio connector of a mobile digital device, in which audio output is needed in both of the audio output channels.

FIG. 6 is a block schematic diagram of an implementation 60 for providing power and communications for an electronic accessory from an audio connector of a mobile digital device, in which audio output is needed or desired in both of the audio output channels. The implementation 60 is particularly useful for situations wherein the electronic accessory only needs to be powered up for short operating cycles during which communication may be needed. The illustrative implementation 60 includes an energy harvest circuit 66 and an application logic controller 70. One of the audio output channels, the right channel as exemplified herein, is provided as an input to a high pass filter 64 and a low pass filter 63. The other audio output channel, the left channel as exemplified herein, is provided as an input to a high pass filter 74 and a low pass filter 73.

Illustratively, the application on the mobile digital device generates on the right audio channel a composite of two signals, a power carrier signal 62 and the normal audio content signal 61 which is expected to be heard by the user on a speaker or headset. The power carrier signal may be centered on a frequency that is sufficiently higher than the normal audio output. In the exemplary implementation described herein the power carrier signal is centered at 22.5 KHz.

High pass filter 64 blocks or severely attenuates all frequencies below a designed cutoff frequency, referred to as fc1 for clarity. A more complete description of a high pass filter may be done by specifying various parameters such as the following: "Ap" amount of ripple allowed in the pass band in decibels, "Ast" attenuation in the stop band in decibels, "Fpbc" pass band cutoff frequency, and "Fsbc" stop band cutoff frequency (fc1 mentioned above). In the exemplary implementation 60, suitable illustrative values for the various parameters of the high pass filter 64 are as follows: Ap=0.5 decibels, Ast=60 decibels, Fpbc=21 KHz, and Fsbc=16 KHz. Implemented with these values, the high pass filter 64 provides an output that is mainly the power carrier 62 with very minute quantities of normal audio content (not shown). The energy harvest circuit 66 is presented with essentially the power carrier signal and thereby generate the power Vcc needed to operate the electronic accessory. Alternatively, the energy harvest circuit 66 may be implemented in such a way as to discriminate against audio frequencies, in which case the high pass filter 64 may be omitted.

Low pass filter 63 blocks or severely attenuates all frequencies above a designed cutoff frequency, referred to as fc2 for clarity. A more complete description of a low pass filter may be done by specifying various parameters such as the following: "Ap" amount of ripple allowed in the pass band in decibels, "Ast" attenuation in the stop band in decibels, "Fpbc" pass band cutoff frequency, and "Fsbc" stop band cutoff frequency (fc2 mentioned above). In the exemplary implementation 60, suitable illustrative values for the various parameters of the low pass filter 63 are as follows: Ap=0.5 decibels, Ast=60 decibels, Fpbc=16 KHz, and Fsbc=20 KHz. Implemented with these values, the low pass filter 63 provides an output that is mainly the normal audio content 61 with very minute quantities of the power carrier (not shown). The right channel speaker or audio output connector 65 is thereby presented with the normal audio content expected by the user for this channel.

Illustratively, the application on the mobile digital device generates on the left audio channel a composite of two signals, a transmit data signal 72 and the normal audio content signal 71 which is expected to be heard by the user on a speaker or headset. The transmit data signal may be centered on a frequency that is sufficiently higher than the normal audio output. In the exemplary implementation described herein the transmit data signal is centered at 22.5 KHz.

High pass filter 74 blocks or severely attenuates all frequencies below a designed cutoff frequency, referred to as fc3 for clarity. A more complete description of a high pass filter may be done by specifying various parameters such as the following: "Ap" amount of ripple allowed in the pass band in decibels, "Ast" attenuation in the stop band in decibels, "Fpbc" pass band cutoff frequency, and "Fsbc" stop band cutoff frequency (fc3 mentioned above). In the exemplary implementation 60, suitable illustrative values for the various parameters of the high pass filter 74 are as follows: Ap=0.5 decibels, Ast=60 decibels, Fpbc=20 KHz, and Fsbc=16 KHz. Implemented with these values, the high pass filter 74 provides an output that is mainly the transmit data 72 with very minute quantities of normal audio content (not shown). The output of the high pass filter 74 is provided to a demodulator 76 to extract the transmit data, and digitizes and provides it to the application logic controller 70 for such processing as desired.

Low pass filter 73 blocks or severely attenuates all frequencies above a designed cutoff frequency, referred to as fc4 for clarity. A more complete description of a low pass filter may be done by specifying various parameters such as the following: "Ap" amount of ripple allowed in the pass band in decibels, "Ast" attenuation in the stop band in decibels, "Fpbc"

pass band cutoff frequency, and "Fsbc" stop band cutoff frequency (fc4 mentioned above). In the exemplary implementation 60, suitable illustrative values for the various parameters of the low pass filter 73 are as follows: Ap=0.5 decibels, Ast=60 decibels, Fpbc=16 KHz cutoff, and Fsbc=20 KHz. Implemented with these values, the low pass filter 73 provides an output that is mainly the normal audio content 71 with very minute quantities of the transmit data (not shown). The left channel speaker or audio output connector 75 is thereby presented with the normal audio content expected by the user for this channel.

The application logic controller 70 has full knowledge of any required digital data transmission to the mobile digital device. A transmission request generator 78 under control of the application logic controller 70 generates a binary control signal referred to as ALC Transmit Request, which is provided to switch 67. When active, the ALC Transmit Request causes the switch 67 to route the receive data signal from the application logic controller 70 through a digital-to-analog converter 68 to the audio input channel MIC. When inactive, the ALC Transmit Request causes the switch 67 to route the output of the microphone 69 to the audio input channel MIC. This allows the ALC receive data to be available to the mobile digital device when required.

Many of the functional blocks of FIG. 6 may be implemented in hardware, software, firmware, or any combination thereof. The low pass filter 63, high pass filter 64, low pass filter 73, high pass filter 74, and demodulator 76, for example, may be implemented in physical circuits. Alternatively, the low pass filter 63, low pass filter 73, high pass filter 74, and demodulator 76 in particular may be implemented in software stored in the memory of the application logic controller 70 and executed by the application logic controller 70. If desired, the audio input from the microphone 69 may be digitized (not shown) and processed digitally along with the receive date by the application logic controller 70.

Figure 7:
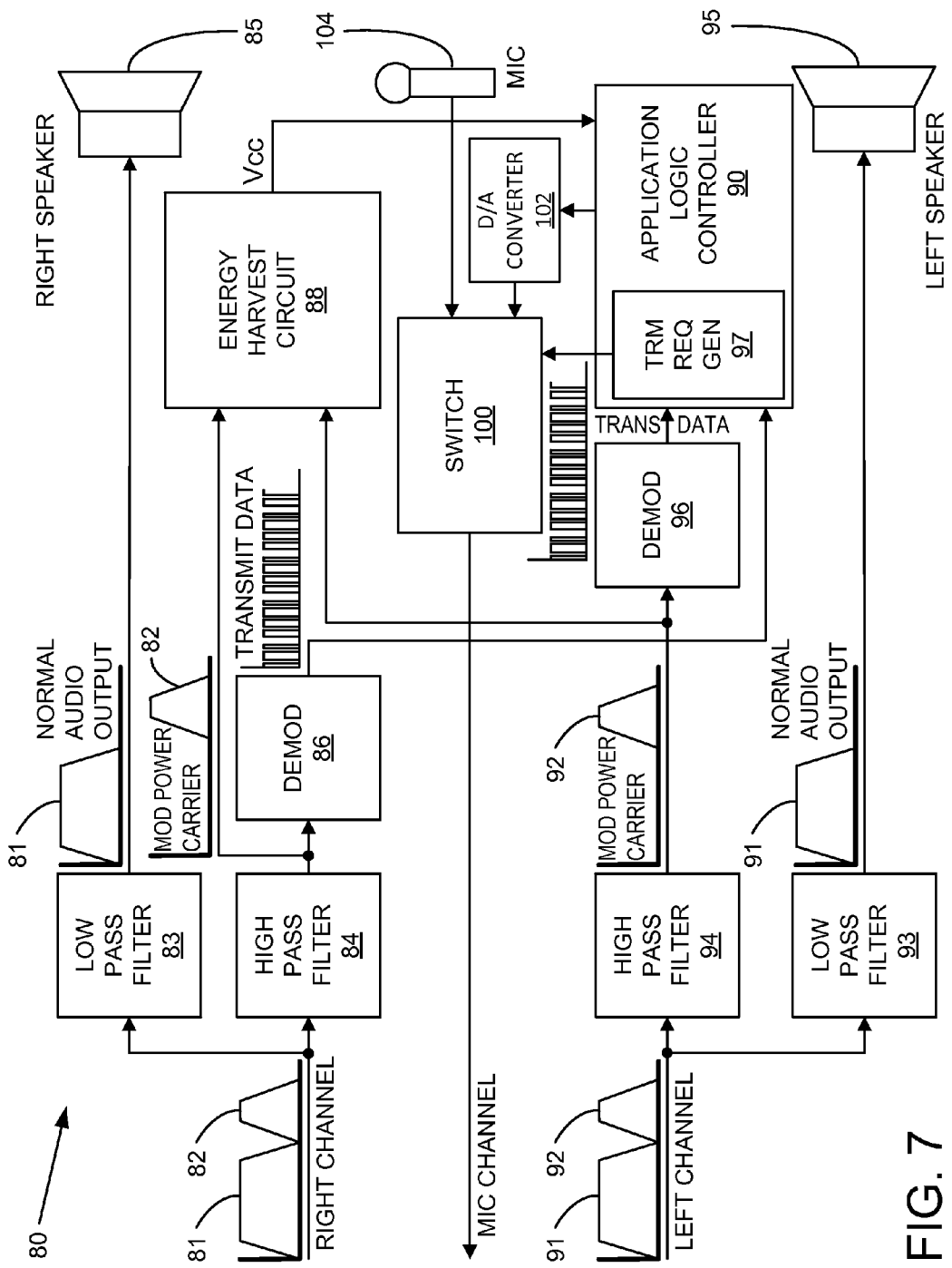
FIG. 7 is a block schematic diagram of another implementation for providing power and communications for an electronic accessory from an audio connector of a mobile digital device, in which audio output is needed in both of the audio output channels.

FIG. 7 is a block schematic diagram of an implementation 80 for providing power and communications for an electronic accessory from an audio connector of a mobile digital device, in which audio output is needed in both of the audio output channels. Like the implementation 60, implementation 80 is particularly useful for situations wherein the electronic accessory only needs to be powered up for brief operating cycles during which it may need to communicate. However, implementation 80 is further suitable for situations wherein the electronic accessory has a higher power requirement. A novelty of this implementation is that both audio output channels may contain the power carrier signal, the transmit data signal, and normal audio content. The illustrative implementation 80 includes an energy harvest circuit 88 and an application logic controller 90. One of the audio output channels, the right channel as exemplified herein, is provided as an input to a high pass filter 84 and to a low pass filter 83. The other audio output channel, the left channel as exemplified herein, is provided as an input to a high pass filter 94 and to a low pass filter 93.

Illustratively, the application on the mobile digital device generates on the right audio channel a composite of two signals, a power carrier signal 82 which is modulated, and normal audio content signal 81 which is expected to be heard by the user on a speaker or headset. The power carrier signal 82 may be centered on a frequency that is sufficiently higher than the normal audio output. In the exemplary implementation described herein, the power carrier signal is centered at 22.5 KHz. Illustratively, the application on the mobile device modulates a pure power carrier in a manner suitable to allow information to be carried on it to form the modulated power carrier signal 82. As an example, the modulation may be a Frequency Shift Keying ("FSK") technique, provided the frequencies used are sufficiently higher than the normal audio output.

High pass filter 84 blocks or severely attenuates all frequencies below a designed cutoff frequency, referred to as fc5 for clarity. Suitable illustrative values for the various parameters of the high pass filter 84 may be the same as for the high pass filter 64. Implemented with these values, the high pass filter 84 provides to the energy harvest circuit 88 an output that is mainly the power carrier 82 with very minute quantities of normal audio content (not shown) along with the modulation, illustratively FSK modulation, which has very little impact on the performance of the energy harvest circuit 88 in generating the power Vcc needed to operate the various components of the implementation 80 as well as the electronic accessory.

The output of the high pass filter 84 is also provided to a demodulator 86 which demodulates the power carrier 82 to extract the transmit data, and digitizes and provides it to the Application Logic Controller 90 for further processing. Suitable demodulators are available for a variety of different modulation techniques.

Low pass filter 83 blocks or severely attenuates all frequencies above a designed cutoff frequency, referred to as fc6 for clarity. Suitable illustrative values for the various parameters of the low pass filter 83 may be the same as for the low pass filter 63. Implemented with these values, the low pass filter 83 provides an output that is mainly the normal audio content 81 with very minute quantities of the power carrier (not shown). The right channel speaker or audio output connector 85 is thereby presented with the normal audio content expected by the user for this channel.

Illustratively, the application on the mobile digital device generates on the left audio channel a composite of two signals, a power carrier signal 92 which is modulated, and normal audio content signal 91 which is expected to be heard by the user on a speaker or headset. The power carrier signal 92 may be centered on a frequency that is sufficiently higher than the normal audio output. In the exemplary implementation described herein, the power carrier signal is centered at 22.5 KHz. Illustratively, the application on the mobile device modulates a pure power carrier in a manner suitable to allow information to be carried on it to form the modulated power carrier signal 92. As an example, the modulation may be a Frequency Shift Keying ("FSK") technique, provided the frequencies used are sufficiently higher than the normal audio output.

High pass filter 94 blocks or severely attenuates all frequencies below a designed cutoff frequency, referred to as fc7 for clarity. Suitable illustrative values for the various parameters of the high pass filter 94 may be the same as for high pass filter 74. Implemented with these values, the high pass filter 94 provides to the energy harvest circuit 88 an output that is mainly the power carrier 92 with very minute quantities of normal audio content (not shown) along with the modulation, illustratively FSK modulation, which has very little impact on the performance of the energy harvest circuit 88 in generating the power Vcc needed to operate the electronic accessory and the application logic circuit 90.

The output of the high pass filter 94 is also provided to a demodulator 96 which demodulates the power carrier 92 to extract the transmit data, and digitizes and provides it to the Application Logic Controller 90 for further processing. Suitable demodulators are available for a variety of different modulation techniques.

Low pass filter 93 blocks or severely attenuates all frequencies above a designed cutoff frequency, referred to as fc8 for clarity. Suitable illustrative values for the various parameters of the low pass filter 93 may be the same as for the low pass filter 73. Implemented with these values, the low pass filter 93 provides an output that is mainly the normal audio content 91 with very minute quantities of the transmit data (not shown). The left channel speaker or audio output connector 95 is thereby presented with the normal audio content expected by the user for this channel.

The power carrier signals 82 and 92 and the energy harvest circuit 88 may be designed in any desired manner to improve the efficiency of energy harvesting. One such design technique is to provide the power carrier signals 82 and 92 180 degrees out-of-phase with one another. Another such design technique is to design the power carrier signals 82 and 92 to generate different voltages.

The application logic controller 90 has full knowledge of any required digital data transmission to the mobile digital device. A transmission request generator 97 under control of the application logic controller 90 generates a binary control signal referred to as ALC Transmit Request, which is provided to switch 100. When active, the ALC Transmit Request causes the switch 100 to route the receive data signal from the application logic controller 90 to the audio input channel MIC through a digital-to-analog converter 102. When inactive, the ALC Transmit Request causes the switch 100 to route the output of the microphone 104 to the audio input channel MIC. This allows the ALC receive data to be available to the mobile digital device when required.

Many of the functional blocks of FIG. 7 may be implemented in hardware, software, firmware, or any combination thereof. The low pass filter 83, high pass filter 84, demodulator 86, low pass filter 93, high pass filter 94, and demodulator 96, for example, may be implemented in physical circuits. Alternatively, the low pass filter 83, demodulator 86, low pass filter 93, and demodulator 96 in particular may be implemented in software stored in the memory of the application logic controller 90 and executed by the application logic controller 90. If desired, the audio input from the microphone 104 may be digitized (not shown) and processed digitally along with the receive date by the application logic controller 90.

Some of the techniques described above may be combined in various ways to achieve other implementations with other characteristics. One such implementation, for example, may use a broadband signal on each of the audio channel outputs, which includes the audio and the FSK-modulated high frequency power carrier simultaneously. This embodiment would be applicable to yet another niche, namely were the electronic accessory requires continuous power at a low level.

Figure 8:
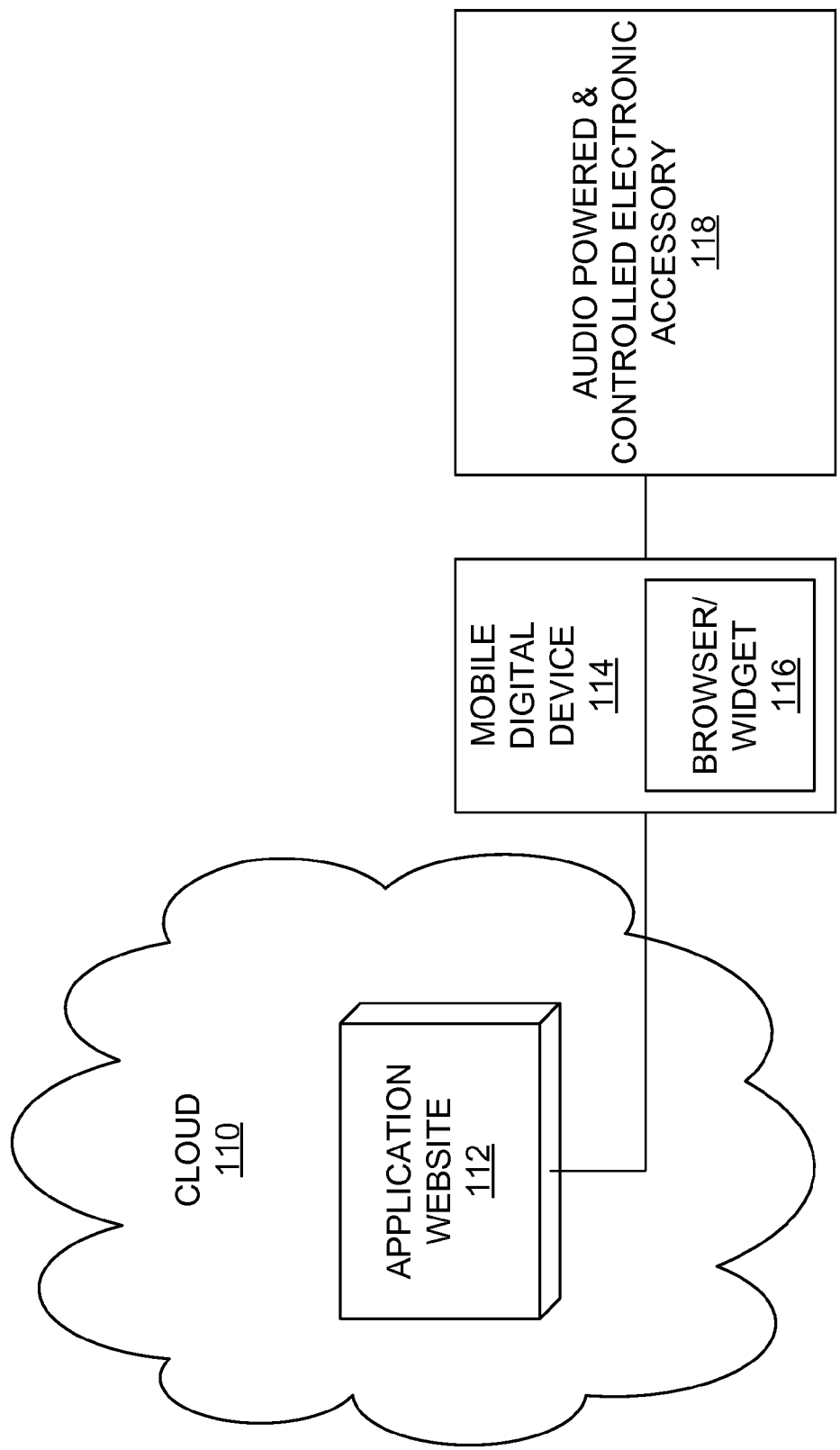
FIG. 8 is a block schematic diagram of an implementation for powering and controlling an electronic accessory for a mobile digital device without having the application for the electronic accessory installed on the mobile digital device.

FIG. 8 is a schematic block diagram of an audio-powered and controlled electronic accessory 118 which is being controlled by the user of a mobile digital device 114 by interacting with an application on an application website 112 in the cloud 110 rather than by interacting with a specific application on the mobile digital device 114. The application website 112 may be accessed using any desired website access software such as, for example, a browser or a widget 116. Advantageously, a widget avoids the need for the user to launch a browser and navigate to a specific browser page or site. Since the application running on the application website 112 may control power to the electronic accessory 118, the application website 112 may withhold power from or terminate power to the electronic accessory 118 if the user fails a security check, does not provide or "pay" pre-arranged credentials, runs out of use credits, or otherwise violates or fails to satisfy some requirement for initial or continued use of the electronic accessory 118. Moreover, the electronic accessory 118 may itself contain security credentials, so that the application running on the application website 112 may confirm the security credentials before authorizing access by the mobile digital device 114 to the application website 112.

An application may be distributed between the mobile digital device 114 and the cloud 110 if desired. In an illustrative client-server arrangement, for example, a client portion of the application may run on the mobile digital device 114 while a server portion of the application may run on the application website 112. Highly sensitive operations such as security and financial may be handled by the server portion of the application, while other operations such as interfacing with the user may be handled by the client portion of the application.

Various functional blocks included herein are described to a level sufficient for implementation by one of ordinary skill in the art. Bi-directional communication, for example, may be achieved through any number of well understood techniques. For example, Frequency Shift Keying ("FSK") allows the digital bits of information, i.e. the "1" and "0" states to be represented through two distinct frequencies. Another well understood technique is to use Phase Shift Keying ("PSK") to similarly encode the digital state of the information bits being sent between the electronic accessory and the mobile digital device. Similarly, Pulse Width Modulation ("PWM"), wherein the "1" and "0" states are differentiated by well separated pulse widths, may be used to represent the digital state of the information being exchanged. Other useful and suitable implementation details are disclosed in Ye-Sheng Kuo et al., "Hijacking Power and Bandwidth from the Mobile Phone's Audio Interface," ACM DEV'10: Proceedings of the First ACM Symposium on Computing for Development, December 2010, which hereby is incorporated herein in its entirety by reference thereto.

Mobile digital device and electronic accessories may include a processor and a computer-readable medium in any suitable combination of hardware, firmware and software. Examples of processors include microprocessors, controllers and logic circuits, and a processor may be implemented as a multi-core unit or by multiple processor units. Examples of computer readable media, which may be realized in a single type of read-only memory or readable-writable memory or which may include combinations of different types of memory, include static random access memory ("SRAM"), dynamic random access memory ("DRAM"), FLASH memory, solid-state memory, magnetic memory, optical memory, and so forth. Data and programs containing processor-executable instructions for operating the mobile personal digital device and implementing various applications including applications for interfacing with electronic accessories may be stored in the computer-readable medium and executed by the processor.

The various embodiments of the invention described herein are illustrative. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed:

1. An apparatus for powering and controlling an electronic accessory from a mobile digital device, comprising:
   a right audio channel input terminal;

a left audio channel input terminal;

a microphone output terminal;

a signal selector coupled to the right audio channel input terminal and to the left audio channel input terminal, and having a power output for providing a power carrier from one or both of the right and left audio channel input terminals, a transmit data output for providing transmit data from one or both of the right and left audio channel input terminals, and an audio output for providing an audio signal from one or both of the right and left audio channel input terminals;

a signal integrator coupled to the microphone output terminal for outputting on the microphone output terminal an integrated signal comprising an audio signal from an audio input and receive data from a receive data input;

an application logic controller for controlling interactions between the mobile digital device and the electronic accessory, the application logic controller having an input coupled to the transmit data output of the signal selector, and an output coupled to the receive data input of the signal integrator; and an energy harvester coupled to the power output of the signal selector for generating power for the signal selector, the signal integrator, the application logic controller, and the electronic accessory from the power carrier.

2. The apparatus of claim 1 further comprising an electronic accessory, the right audio channel input terminal, the left audio channel input terminal, the microphone output terminal, the signal selector, the signal integrator, the application logic controller, and the energy harvester being included within the electronic accessory.

3. The apparatus of claim 1 further comprising a power and communications adapter separate from the electronic accessory, the right audio channel input terminal, the left audio channel input terminal, the microphone output terminal, the signal selector, the signal integrator, the application logic controller, and the energy harvester being included within the power and communications adapter.

4. The apparatus of claim 1 wherein the signal selector comprises:

a conductor coupling the power output to a first one of the right and left audio channel input terminals;

carrier detect logic coupled to the first one of the right and left audio channel input terminals;

a first switch coupled to the carrier detect logic, the first switch having an input coupled to a second one of the right and left audio channel input terminals different from the first one of the right and left audio channel input terminals, and further having a first output comprising the audio output, and a second output; and an analog-to-digital converter having an input coupled to the second output of the switch and an output comprising the transmit data output.

5. The apparatus of claim 4 wherein the application logic controller comprises a transmission request generator; and wherein the signal integrator comprises:

a digital-to-analog converter having an input comprising the receive data input, and an output; and a second switch having a first input coupled to the output of the digital-to-analog converter, a second input comprising the the audio input, an output coupled to the microphone output terminal, and a control terminal coupled to the transmission request generator.

6. The apparatus of claim 1 wherein the audio output comprises a first channel and a second channel; and wherein the signal selector comprises:

a first high pass filter having an input coupled to a first one of the right and left audio channel input terminals, and an output comprising the power output;

a second high pass filter having an input coupled to a second one of the right and left audio channel input terminals different from the first one of the right and left audio channel input terminals, and an output;

a demodulator having an input coupled to the output of the second high pass filter, and an output comprising the transmit data output;

a first low pass filter having an input coupled to the first one of the right and left audio channel input terminals, and an output comprising the first channel of the audio output; and a second low pass filter having an input coupled to the second one of the right and left audio channel input terminals, and an output comprising the second channel of the audio output.

7. The apparatus of claim 6 wherein the application logic controller comprises a transmission request generator; and wherein the signal integrator comprises:

a digital-to-analog converter having an input comprising the receive data input, and an output; and a switch having a first input coupled to the output of the digital-to-analog converter, a second input comprising the the audio input, an output coupled to the microphone output terminal, and a control terminal coupled to the transmission request generator.

8. The apparatus of claim 1 wherein the audio output comprises a first channel and a second channel; wherein the power output comprises a first power output component and a second power output component; wherein the transmit data output comprises a first transmit data output component and a second transmit data output component; and wherein the signal selector comprises:

a first high pass filter having an input coupled to a first one of the right and left audio channel input terminals, and an output comprising the first power output component;

a first demodulator having an input coupled to the output of the first high pass filter, and an output comprising the first transmit data output component;

a second high pass filter having an input coupled to a second one of the right and left audio channel input terminals different from the first one of the right and left audio channel input terminals, and an output comprising the second power output component;

a second demodulator having an input coupled to the output of the second high pass filter, and an output comprising the second transmit data output component;

a first low pass filter having an input coupled to the first one of the right and left audio channel input terminals, and an output comprising the first channel of the audio output; and a second low pass filter having an input coupled to the second one of the right and left audio channel input terminals, and an output comprising the second channel of the audio output.

9. The apparatus of claim 8 wherein the application logic controller comprises a transmission request generator; and wherein the signal integrator comprises:

a digital-to-analog converter having an input comprising the receive data input, and an output; and a switch having a first input coupled to the output of the digital-to-analog converter, a second input comprising the the audio input, an output coupled to the microphone output terminal, and a control terminal coupled to the transmission request generator.

* * * * *